United States Patent
Pecak et al.

(10) Patent No.: US 10,100,931 B2
(45) Date of Patent: Oct. 16, 2018

(54) SEALING LIP FOR A LOW FRICTION BONDED PISTON SEAL

(71) Applicant: Aktiebolaget SKF, Gothenburg (SE)

(72) Inventors: Robert D Pecak, Naperville, IL (US); Daniel J Levy, Schaumburg, IL (US); Lance A Petzold, Oswego, IL (US)

(73) Assignee: AKTIEBOLAGET SKF, Gothenburg (SE)

(*) Notice: Subject to any disclaimer, the term of this patent is extended or adjusted under 35 U.S.C. 154(b) by 0 days.

(21) Appl. No.: 15/642,473

(22) Filed: Jul. 6, 2017

(65) Prior Publication Data

US 2018/0031128 A1 Feb. 1, 2018

Related U.S. Application Data

(60) Provisional application No. 62/368,681, filed on Jul. 29, 2016.

(51) Int. Cl.
  *F16J 15/3232* (2016.01)
  *F16J 15/3284* (2016.01)
  *F16J 15/16* (2006.01)
  *F16J 15/3204* (2016.01)

(52) U.S. Cl.
  CPC ......... *F16J 15/3232* (2013.01); *F16J 15/164* (2013.01); *F16J 15/3204* (2013.01); *F16J 15/3284* (2013.01)

(58) Field of Classification Search
  CPC .... F16J 15/3232; F16J 15/3284; F16J 15/164; F16J 15/3204

USPC .......................................................... 277/345
See application file for complete search history.

(56) References Cited

U.S. PATENT DOCUMENTS

| | | | | |
|---|---|---|---|---|
| 2,806,725 A | * | 9/1957 | Kosatka | F16J 15/3284 277/553 |
| 4,613,143 A | * | 9/1986 | Butler | B29C 43/18 277/559 |
| 5,013,052 A | * | 5/1991 | Butler | F16J 15/3232 277/402 |
| 6,676,132 B1 | * | 1/2004 | Takebayashi | F16J 15/002 277/549 |

* cited by examiner

*Primary Examiner* — Nathan Cumar
(74) *Attorney, Agent, or Firm* — Bryan Peckjian; SKF USA Inc. Patent Dept.

(57) ABSTRACT

An annular seal for a low friction bonded piston seal is provided. The annular seal having a central axis and including an annular seal body symmetrically positioned about the central axis. The annular seal is integrally molded to the body and provides a lower seal lip body, and a top seal lip. The top seal lip including a first radial lip thickness T1 and a second radial lip thickness T2. A ratio between second radial lip thickness T2 to first radial lip thickness T1 is less than 1.00. The annular seal includes a radial lip height H, and a radial lip overall pressure received thickness T3. A ratio of radial lip height H to second radial lip thickness T2 is greater than or equal to 0.65. The radial lip overall pressure received thickness T3 is less than or equal to 0.8 mm. The first radial lip thickness T1 is less than or equal to 0.7 mm.

7 Claims, 4 Drawing Sheets

SEALING LIP FOR A LOW FRICTION BONDED PISTON SEAL

CROSS-REFERENCE TO RELATED APPLICATIONS

This application claims priority to U.S. Provisional Application No. 62/368,681 filed on Jul. 29, 2016, the contents of which are fully incorporated herein by reference.

FIELD OF THE INVENTION

The present disclosure generally relates to bonded piston seals. More particularly, the present disclosure relates to a sealing lip for a low friction bonded piston seal.

BACKGROUND OF THE INVENTION

Because pressure is required to stroke a bonded piston, its sealing lip will be pressurized during stroking. The standard practice is to design a sealing lip that will be highly sensitive to pressure to ensure that it will be pressure-activated and therefore will not leak. However, a higher degree of pressure actuation (as shown by the downward arrows) will result in a higher normal force under pressure and therefore a higher sliding load.

FIG. 1 shows a radial cross-sectional view of a prior art sealing lip. So, the prior art shows an increased pressure received area, which means increased pressure directly transferred to the sealing lip.

Accordingly, the problem to be solved by the present invention is reduced lip sliding friction. The present invention reduces the sliding load of a bonded piston by:
a. Reducing the pressure received area of the sealing lip; and
b. Reducing the static load of the sealing lip by eliminating rubber material on the back side of the sealing lip near the contact point. Lip integrity and ease of assembly (installation) is not compromised.

The invention works by drastically reducing the normal force exerted by the lip onto the lip running surface. This is achieved in two ways:
a. Reduction of sealing lip pressure received area. Because pressure is required to stroke the bonded piston, the sealing lip will be pressurized during stroking. The standard practice is to design a sealing lip that will be highly sensitive to pressure to ensure that it will be pressure-activated and therefore will not leak. However, a higher degree of pressure actuation will result in a higher normal force under pressure and therefore a higher sliding load.
b. Elimination of material at the backside of the sealing lip near the contact point. This allows the lip to flex onto the running surface (either stretch onto a shaft or compress into a bore) much more easily because there is much less material to manipulate. This greatly reduces lip normal force.

FIG. 2 shows a radial cross-sectional view of a sealing lip of the present invention. As such, the present invention shows a reduced pressure received area, which means less pressure directly transferred to the sealing lip. Accordingly, the present invention solves this problem by providing a sealing lip that delivers a reduced pressure received area of the sealing lip and a reduced static load of the sealing lip by eliminating rubber material on a back side of the sealing lip near the contact point.

SUMMARY OF THE INVENTION

The basic inventive concept provides an annular seal for a low friction bonded piston seal. The annular seal having a central axis, and an annular seal body symmetrically positioned about the central axis, and an annular seal lip integrally molded to the body, and a lower seal lip body, and a top seal lip having a first radial lip thickness T1, a second radial lip thickness T2, a radial lip height H, and a radial lip overall pressure received thickness T3.

In a first aspect of the invention a ratio of the second radial lip thickness T2 to first radial lip thickness T1 is less than 1.00.

In a second aspect of the invention a ratio of radial lip height H to second radial lip thickness T2 is greater than or equal to 0.65.

In further aspect of the invention the radial lip overall pressure received thickness T3 is less than or equal to 0.8 mm.

In further aspect of the invention the first radial lip thickness T1 is less than or equal to 0.7 mm.

In further aspect of the invention the radial lip overall pressure received thickness T3 is determined by the horizontal distance between reference points P1 and P3.

In further aspect of the invention the first radial lip thickness T1 is determined by the horizontal distance between reference points P1 and P2.

In further aspect of the invention The radial lip height H is determined by the vertical distance between first horizontal line X1 and second horizontal line X2 and from reference points P1 and P4.

In further aspect of the invention the second radial lip thickness T2 is determined by the horizontal distance between reference points P3 and P4.

In a final aspect of the invention P1, P2, P3 and P4 all lay on an outer surface of the annular sealing lip, wherein P1 is located at an intersection of first horizontal line X1 and an endpoint of a first radial lip radius R1 also laying on the horizontal line, and wherein the center point of the first lip radius R1 further lays on horizontal line X1.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Figure 3:
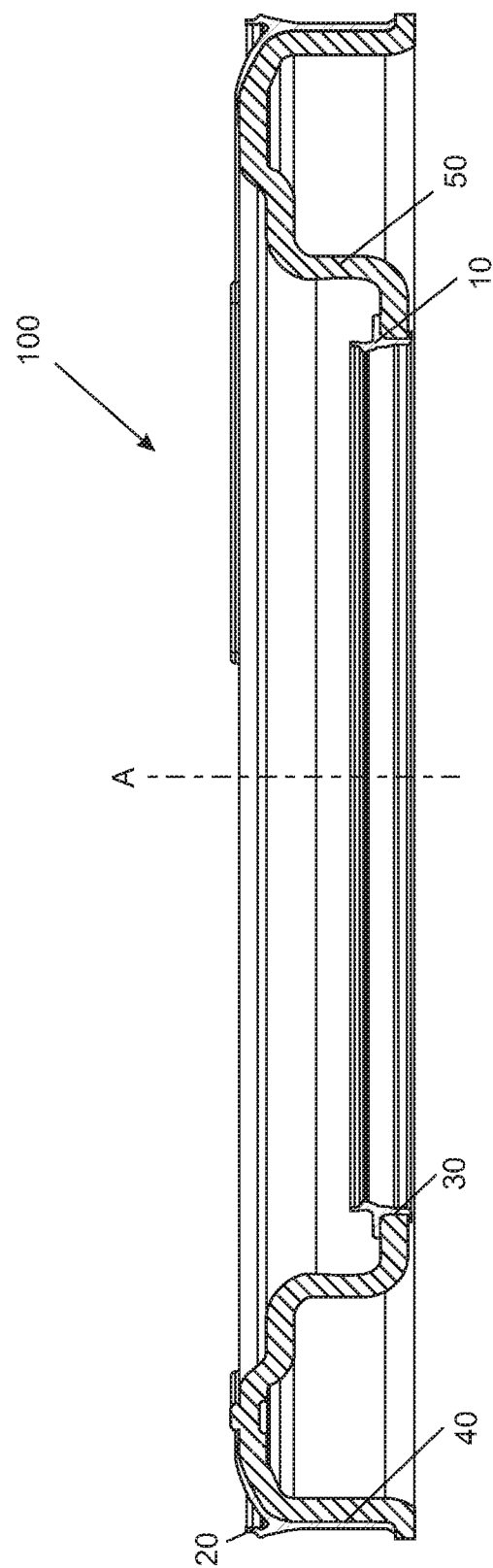
FIG. 3 is a broken away, enlarged axial cross-sectional view of a seal assembly according to a preferred embodiment of the present invention.

For purposes of description herein, the terms "upper," "lower," "left," "rear," "right," "front," "vertical," "horizontal," and derivatives thereof shall relate to the invention as oriented in FIG. 3. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
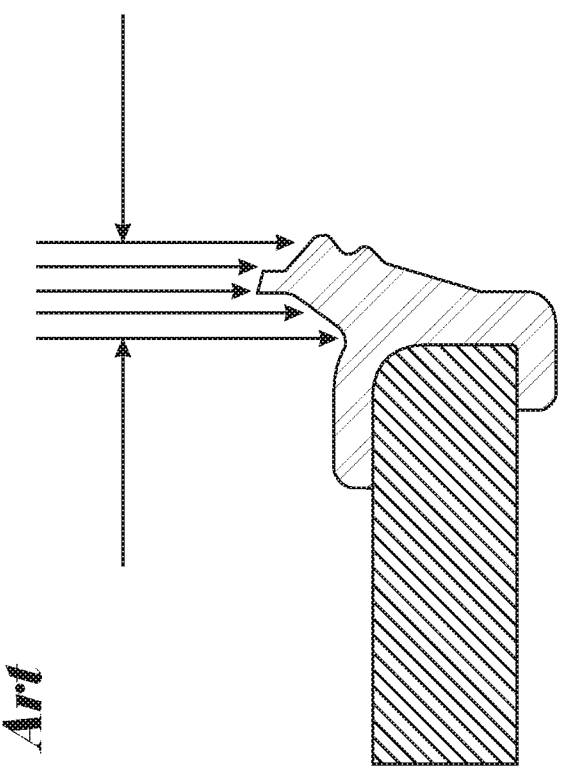
FIG. 2 is a radial cross-sectional view of a sealing lip according to a preferred embodiment of the present invention.
Figure 1:
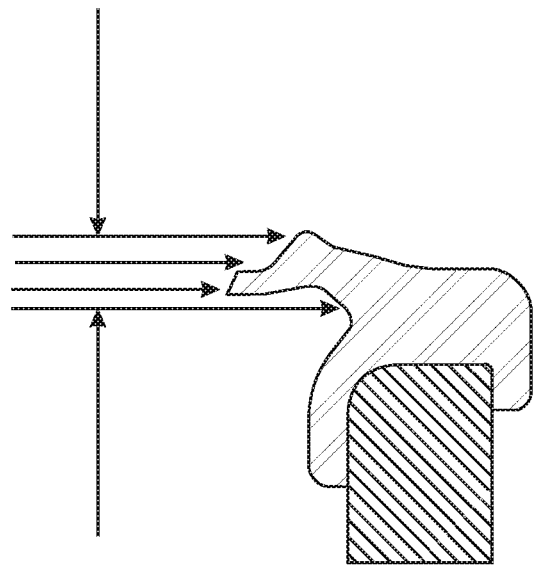
FIG. 1 is a radial cross-sectional view of a prior art sealing lip.

As was previously disclosed in the background, FIG. 1 shows a radial cross-sectional view of a prior art sealing lip with downward arrows showing pressure, while FIG. 2 shows a radial cross-sectional view of a sealing lip of the present invention also with downward arrows showing pressure. The purpose of these illustrations is to show how invention works by drastically reducing the normal force exerted by the lip onto the lip running surface.

An annular seal 10 that is symmetrically positioned about a central axis A is illustrated in FIG. 3. As mentioned in the Background, the annular seal 10 is used in a low friction bonded piston seal 100. The bonded piston seal 100 of the present invention is configured to provide a seal body 50 and may provide at least one annular inner seal 10 bonded to an inside diameter 30 of the seal body 50 and may provide at least one annular outer seal 20 bonded to an outside diameter 40 of the body 50.

Figure 4:
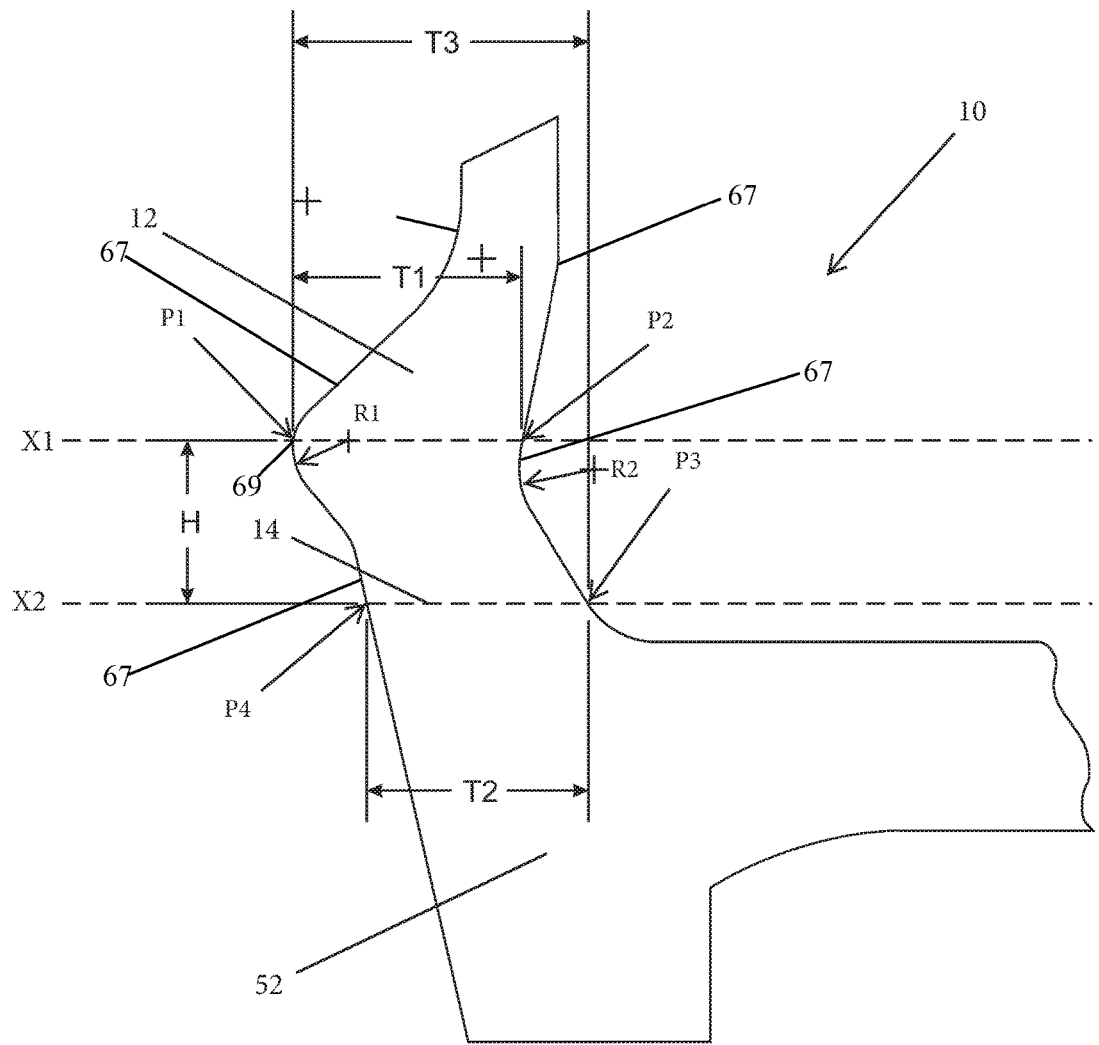
FIG. 4 is a plan view of the radial cross-section of the sealing lip according to FIG. 2.

There is shown in FIG. 4 a radial cross-sectional view of the seal 10. Seal 10 will now be described in terms of what is critical to its ability to function as a low friction seal 10. As such, the seal will be broken down into two components: a top seal lip 12 and a lower seal lip body 52. Here, the geometry of the top seal lip 12 determines the sliding load of the bonded piston seal 100.

Seal lip 69 formed along the outer surface 67 of the annular sealing lip 10 is configured to form a seal with the lip running surface. Horizontal line X2 bisects seal 12 at a base 14 of the top seal lip 12 and an upper portion 16 of the lower seal lip body 52. The top seal lip 12 provides a first radial lip thickness T1. The first radial lip thickness T1 is determined by the horizontal distance between reference points P1 (referred to as "the first location" in the claims) and P2 (referred to as "the second location" in the claims). P1 is located at an intersection of a first horizontal line X1 and the middle of an arc of a first radial lip radius R1 at a far left vertical tangent point. The center point of the first lip radius R1 further lays on horizontal line X1. P2 is located at an intersection of a second lip radius R2 and Horizontal line X1. Based on testing and FEA (finite element analysis) it has been determined that a seal 10 having a first radial lip thickness T1 less than or equal to 0.7 mm is optimal.

The top seal lip 12 includes a second radial lip thickness T2. The second radial lip thickness T2 is determined by the horizontal distance between reference points P3 (referred to as "the third location" in the claims) and P4 (referred to as "the fourth location" in the claims) along horizontal line X2. Accordingly, reference points P3 and P4 reside at left and right endpoints of the base 14 of the top seal lip 12 along horizontal line X2. Once again, based on testing and FEA it has been determined that a seal 10 having a ratio of the second radial lip thickness T2 to first radial lip thickness T1 less than 1.00 is optimal.

The top seal lip 12 has a radial lip height H. The radial lip height H is determined by the vertical distance between first horizontal line X1 and second horizontal line X2 (and by reference points P1 and P4). So here again, a ratio of radial lip height H to second radial lip thickness T2 that is greater than or equal to 0.65 provides an optimal configuration with respect to sliding load of the seal 10.

Finally, the top lip seal 12 further includes a radial lip overall pressure received thickness T3. The radial lip overall pressure received thickness T3 is determined by the horizontal distance between reference points P1 and P3. If the radial lip overall pressure received thickness T3 is less than or equal to 0.8 mm the seal design is once again optimal.

Figure 5:
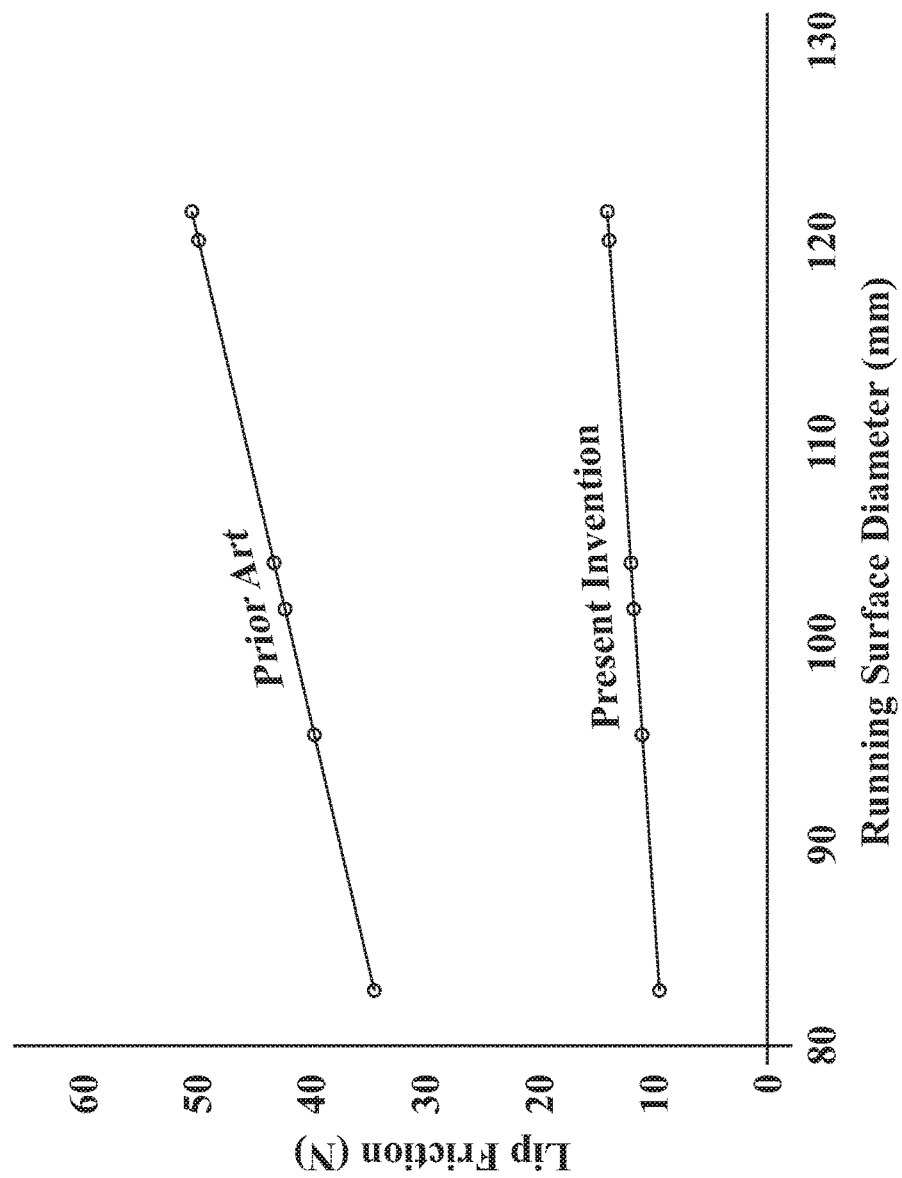
FIG. 5 is a chart showing the estimated differences in Lip Friction (N) versus Running Surface Diameter (mm) between the prior art radial sealing lip cross-section of FIG. 1 and the radial sealing lip cross-section of the present invention shown in FIG. 2; and Like reference numerals refer to like parts throughout the various views of the drawings.

There is shown in FIG. 5 a chart that illustrates bonded piston seal friction estimates. The estimates are based on FEA and testing. The chart shows the results for Lip Friction versus Running Surface Diameter for the prior art seal and the seal of the present invention. The results clearly show that the Lip Friction from the present invention is roughly one third that of the prior art.

The invention claimed is:

1. An annular seal for a low friction bonded piston seal, the annular seal comprising:
   a piston defining a lip running surface, the piston and the lip running surface being configured to move along a central axis,
   an annular seal body symmetrically positioned about the central axis, and
   an annular seal lip integrally molded to the annular seal body and forming a seal with the lip running surface having;
   a lower seal lip body disposed on the annular seal body, and
   a top seal lip body having a seal lip that forms the seal with the lip running surface, the top seal lip body, the seal being formed at a first location along an outer surface of the top seal lip body, a second location along an outer surface of the top seal lip body being located opposite from the first location such that the second location faces away from the lip running surface and such that the first and second locations are at a same radial lip height, the top seal lip body includes a third location and a fourth location along opposite sides of the outer surface, the third and fourth locations being located at a base of the top seal lip body, the third location facing away from the lip running surface, the top seal lip body further comprising:
   a first radial lip thickness measured between the first location and the second location,
   a second radial lip thickness measured between the third location and the fourth location,
   the radial lip height which is measured as the distance along the central axis between the fourth location and the first location, and
   a radial lip overall pressure received thickness measured as the distance in a direction perpendicular to the central axis between the first location and the third location, wherein a ratio of the second radial lip thickness to the first radial lip thickness is less than one (1.00), wherein a ratio of the radial lip height to the second radial lip thickness is greater than or equal to zero point six five (0.65), wherein the radial lip overall pressure received thickness is less than or equal to zero point eight millimeters (0.8 mm), wherein the first radial lip thickness is less than or equal to zero point seven millimeters (0.7 mm), wherein the annular seal lip is free of any elastic member located around the top seal lip body which would exert a force normal to the seal.

2. An annular seal for a low friction bonded piston seal, the annular seal comprising:

a piston defining a lip running surface, the piston and the lip running surface being configured to move along a central axis, an annular seal body symmetrically positioned about the central axis, and an annular seal lip integrally molded to the annular seal body and forming a seal with the lip running surface having;

a lower seal lip body disposed on the annular seal body, and a top seal lip body having a seal lip that forms the seal with the lip running surface, the top seal lip body, the seal being formed at a first location along an outer surface of the top seal lip body, a second location along an outer surface of the top seal lip body being located opposite from the first location such that the second location faces away from the lip running surface and such that the first and second locations are at a same radial lip height, the top seal lip body includes a third location and a fourth location along opposite sides of the outer surface, the third and fourth locations being located at a base of the top seal lip body, the third location facing away from the lip running surface, the top seal lip body further comprising:

a first radial lip thickness measured between the first location and the second location, a second radial lip thickness measured between the third location and the fourth location, the radial lip height which is measured as the distance along the central axis between the fourth location and the first location, and a radial lip overall pressure received thickness measured as the distance in a direction perpendicular to the central axis between the first location and the third location, wherein a ratio of the second radial lip thickness to the first radial lip thickness is less than one (1.00), wherein the annular seal lip is free of any elastic member located around the top seal lip body which would exert a force normal to the seal.

3. The annular seal according to claim 2, wherein a ratio of the radial lip height to the second radial lip thickness is greater than or equal to zero point six five (0.65).

4. The annular seal according to claim 2, wherein the radial lip overall pressure received thickness is less than or equal to zero point eight millimeters (0.8 mm).

5. The annular seal according to claim 2, wherein the first radial lip thickness is less than or equal to zero point seven millimeters (0.7 mm).

6. The annular seal according to claim 4, wherein the first radial lip thickness is less than or equal to zero point seven millimeters (0.7 mm).

7. The annular seal according to claim 3, wherein the first radial lip thickness is less than or equal to zero point seven millimeters (0.7 mm).

* * * * *